April 27, 1965 F. DESTAL 3,180,042

TRANSPARENT MICROFILM CONTAINER

Filed March 26, 1962

INVENTOR.
FREDERICK DESTAL
BY

ATTORNEY

United States Patent Office 3,180,042
Patented Apr. 27, 1965

3,180,042

TRANSPARENT MICROFILM CONTAINER

Frederick Destal, 40 Paladino Ave., New York, N.Y.

Filed Mar. 26, 1962, Ser. No. 182,493
1 Claim. (Cl. 40—10)

This invention concerns a transparent container for microfilmed records.

It has been known heretofore to provide lockets and bracelets of various types in which are mounted one or more pictures for identification purposes. None of these picture holders are wholly satisfactory as identification media because they do not provide sufficient data about the wearer and about members of his family.

It is the main object of the invention to provide a transparent container for microfilmed identification records concerning both the wearer and members of his family, so that in the event of a nuclear disaster, the finding of one identification container will serve to provide official, legal, documentary data about the wearer and his family, acceptable to the authorities.

A further object is to provide an identification container of the character described reinforced to resist wear, tear and deterioration of the microfilm.

Another object is to provide an identification container containing microfilmed records in a transparent body, so that the films can be projected and read in a suitable microfilm reading device.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
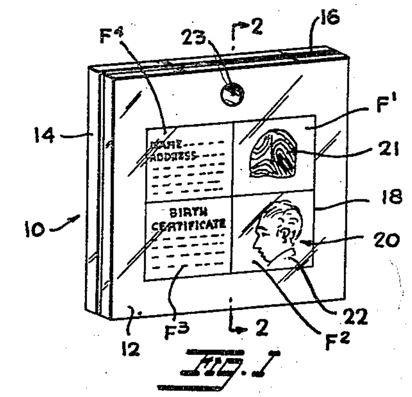
FIG. 1 is a perspective view of one identification container embodying the invention.
Figure 2:
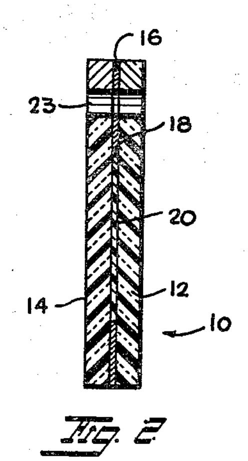
FIG. 2 is a sectional view on an enlarged scale taken on line 2—2 of FIG. 1.

Referring first to FIGS. 1 and 2, there is shown a container 10 including front and rear flat rectangular plates 12, 14 made of rigid transparent plastic material such as acrylic or the like. The plates are fused to a metal or plastic opaque mask 16 disposed between the plates. This mask has a rectangular aperture 18 in which is disposed a rectangular plastic microfilm 20. The microfilm may have a plurality of rectangular frames in each of which is different identification data. Thus, frame F1 may have a fingerprint 21 of the wearer of the container; frame F2 may be a photograph 22 of the wearer; and frames F3 and F4 may be reproductions of official documents such as birth certificates, naturalization certificate, passport, as well as listings of vital information about the wearer. A hole 23 may be formed at one edge of one plate for attachment of a suitable cord or chain to the container.

The subject matter in frames F1–F4 is preferably reduced to microscopic size so that a maximum of data may be recorded on the microfilm. If desired, each of the frames F1–F4 may be a separate piece of microfilm with all films held in flat rectangular array in the aperture 18. The microfilms may be read by insertion of the container 10 in a suitable microfilm reader. The transparent body of the container defined by transparent plates 12, 14 will facilitate optical enlargement of the microfilmed subject matter to visually readable size.

Figure 3:
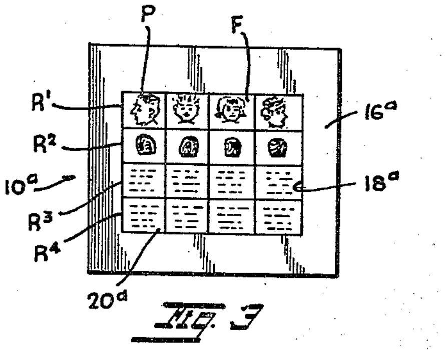
FIG. 3 is a front elevational view of a modified form of identification container.

In FIG. 3 is illustrated another identification container 10$^a$. In the rectangular opening 18$^a$ of frame 16$^a$ is a microfilm 20$^a$ in which is a multiplicity of small rectangular frames F. These frames are micro-microfilm records of vital identification data. Each rectangular frame may be of the order of one or two millimeters on each side. Thus, standard eight millimeter film would have at least four micro-microfilm frames side by side across the film.

The film 20$^a$ could thus have four vertical columns of frames. Each column would contain the vital identification data about a different person. All four columns would identify four persons of a family, for example. The top row R1 might contain pictures P of the persons. The second row R2 might contain fingerprints of the individual persons. The third row R3 might contain recorded official documents such as birth certificates. The fourth row R4 might contain general vital identification data and information.

The container 10$^a$ as described thus provides a convenient means for identifying a wearer thereof and members of his family. If this identification device is found upon the wearer after a disaster, public officials would have authoritative, legal, documentary data at hand concerning the wearer and his family.

Figure 5:
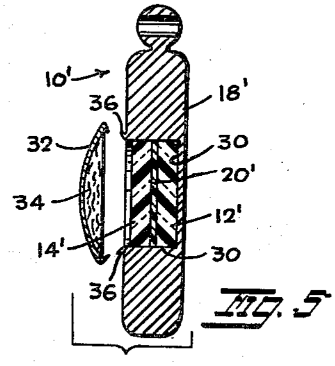
FIG. 5 is a sectional view on an enlarged scale taken on line 5—5 of FIG. 4, the cap being shown detached.
Figure 4:
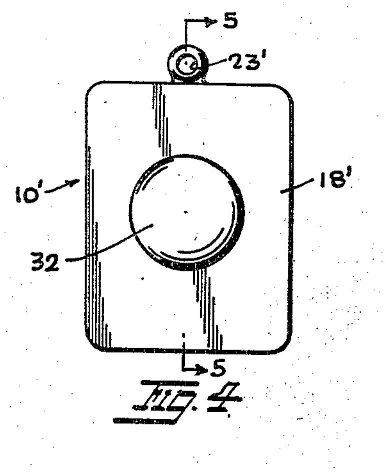
FIG. 4 is a front elevational view of an identification container embodying another modified form of the invention.

In FIGS. 4 and 5 a container 10′ embodying another form of the invention is shown. Container 10′ comprises a rectangular-shaped locket constituted by a rectangular-shaped solid metal body 18′ with a central circular recess 30 formed therein. Detachably mounted in the recess 30 there is an assembly comprising a pair of circular-shaped transparent plastic plates 12′ and 14′ with a circular plastic microfilm 20′ clamped therebetween. A dome-shaped metal cap 32 is formed with an inturned lip 34′ whereby the cap may be snapped over an annular outwardly protruding lip 36 around the recess 30 at the outer end thereof. Cap 32 is lined with asbestos 34. A loop or apertured tab 23′ is formed at one end of the body 18′ for attachment of a suitable cord or chain to the container. The microfilm 20′ has a plurality of rectangular frames similar to the frames F1, F2, F3 and F4 of the frame 16 of the form of FIG. 1.

Figure 6:
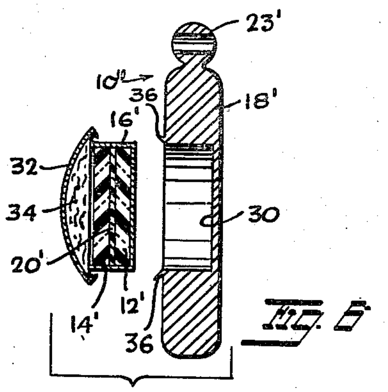
FIG. 6 is a similar view showing still another modified form of container, the microfilm assembly being shown detached.

The modified form of container 10″ shown in FIG. 6 is similar to the form of container 10′ shown in FIGS. 4 and 5 except that the assembly of plates 12′, 14′ and microfilm 20′ are enclosed in a metal cup 16′ which seats in the recess 30.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

In an identification container, a rectangular-shaped solid body having a central circular recess therein, a metal cup-shaped device fitted in said recess, a pair of circular transparent plastic plates in said cup-shaped device, a circular film having a plurality of microfilm frames between said plates, a detachable metal cap closing the recess in the body, an annular lip protruding angularly from the rim of the recess, and an annular lip extending inwardly from the rim of the cap adapted to interlock with the lip on the rim of the recess.

References Cited by the Examiner

UNITED STATES PATENTS

| | | | |
|---|---|---|---|
| 273,685 | 3/83 | Huntley | 40—10 |
| 425,201 | 4/90 | Bennett | 40—152 |
| 1,055,453 | 3/13 | Duran | 40—152 |
| 1,266,256 | 5/18 | Hathaway | 40—10 |
| 1,918,243 | 7/33 | Bergaud | 40—10 |
| 1,941,050 | 12/33 | Punte | 220—60 |
| 2,268,529 | 12/41 | Stiles | 40—152 |
| 2,506,509 | 5/50 | Kratkowski | 40—152 |
| 2,697,889 | 12/54 | Heim | 40—152 |
| 2,959,882 | 11/60 | Krull | 40—152 |

JEROME SCHNALL, *Primary Examiner.*

E. V. BENHAM, *Examiner.*